(12) United States Patent
Owens, Jr. et al.

(10) Patent No.: US 12,085,169 B2
(45) Date of Patent: Sep. 10, 2024

(54) PRESSURE RETAINED GASKET SEAL WITH ENHANCED UNLOADING RESISTANCE

(71) Applicant: Flowserve Pte. Ltd., Singapore (SG)

(72) Inventors: Glenn Robert Owens, Jr., Kalamazoo, MI (US); Daniel A. Nelson, Temecula, CA (US)

(73) Assignee: Flowserve Pte. Ltd., Singapore (SG)

( * ) Notice: Subject to any disclaimer, the term of this patent is extended or adjusted under 35 U.S.C. 154(b) by 0 days.

(21) Appl. No.: 17/482,524

(22) Filed: Sep. 23, 2021

(65) Prior Publication Data
US 2022/0099185 A1    Mar. 31, 2022

Related U.S. Application Data

(60) Provisional application No. 63/083,521, filed on Sep. 25, 2020.

(51) Int. Cl.
*F16J 15/06* (2006.01)
*F16J 15/08* (2006.01)

(52) U.S. Cl.
CPC ......... *F16J 15/0806* (2013.01); *F16J 15/062* (2013.01); *F16J 15/0887* (2013.01)

(58) Field of Classification Search
CPC ...... F16J 15/0887; F16J 15/06; F16J 15/3436; F16J 15/062; F16J 15/0806
See application file for complete search history.

(56) References Cited

U.S. PATENT DOCUMENTS

| 944,423 A | 12/1909 | Feix |
| 4,165,882 A | 8/1979 | Crow |
| 5,564,715 A | 10/1996 | Wallace |

(Continued)

FOREIGN PATENT DOCUMENTS

| CN | 203770642 U | 8/2014 | |
| DE | 102014115842 A1 * | 5/2015 | ............ F01D 11/003 |

(Continued)

OTHER PUBLICATIONS

International Search Report and Written Opinion for PCT Appl. No. PCT/US2021/052015 mail date Dec. 29, 2021, 10 pages.

(Continued)

*Primary Examiner* — Eugene G Byrd
(74) *Attorney, Agent, or Firm* — Maine Cernota & Curran

(57) ABSTRACT

A pressure retained gasket seal provides enhanced resistance to hydraulic unloading by including a notch formed in a rear face of the gasket groove, thereby reducing intrusion of process fluid behind the gasket and improving hydraulic retention of the gasket seal. Embodiments increase the process fluid pressure limit of the gasket seal by a factor of two or three compared to gasket seals of the prior art. In embodiments, the gasket groove has a dovetail cross-section, thereby increasing resistance to process fluid pressure by requiring compression of the gasket before it can be dislodged from the groove. Embodiments form the gasket from flexible graphite, which can be initially shaped as an annulus and then forced by an applied load into the gasket groove in conformance with the notch. Embodiments include compressing the graphite to within 50% or even 70% of its maximum density during installation thereof.

16 Claims, 10 Drawing Sheets

(56) References Cited

U.S. PATENT DOCUMENTS

| | | | |
|---|---|---|---|
| 9,109,459 B2 * | 8/2015 | Sha | F16J 15/3496 |
| 10,731,760 B2 * | 8/2020 | Ishigami | F16J 15/0893 |
| 2006/0049375 A1 * | 3/2006 | Gossett | F16K 25/005 251/357 |
| 2007/0235945 A1 | 10/2007 | Casucci | |
| 2008/0048443 A1 * | 2/2008 | Paton | E21B 17/04 285/333 |
| 2012/0267862 A1 * | 10/2012 | Lillieroth | F02M 61/14 277/592 |
| 2015/0132116 A1 * | 5/2015 | Zheng | F01D 11/003 415/230 |
| 2016/0123471 A1 * | 5/2016 | Roy | F16J 15/0806 148/677 |
| 2018/0283193 A1 * | 10/2018 | Walker | F01D 11/008 |

FOREIGN PATENT DOCUMENTS

| | | | | |
|---|---|---|---|---|
| EP | 443067 A1 | | 8/1991 | |
| JP | 2000356267 A | * | 12/2000 | F16J 15/025 |
| JP | 2001146948 A | * | 5/2001 | F16H 55/56 |
| JP | 2001159465 A | | 6/2001 | |
| JP | 2002276811 A | * | 9/2002 | F16J 15/061 |
| JP | 2003014126 A | * | 1/2003 | F16J 15/024 |
| JP | 2006307930 A | * | 11/2006 | |
| JP | 2007002935 A | * | 1/2007 | F16J 15/062 |
| JP | 2007064294 A | * | 3/2007 | F16J 15/062 |
| JP | 2008019860 A | * | 1/2008 | F01D 11/005 |
| JP | 2011117466 A | * | 6/2011 | F16J 15/024 |
| JP | 2012145233 A | * | 8/2012 | |
| JP | 2015055345 A | | 3/2015 | |
| WO | 0161220 A1 | | 8/2001 | |

OTHER PUBLICATIONS

Machine translation of JP2001159465A, Structure of Seal Part, 6 pages.
Machine translation of JP2006307930A, Seal Channel and Seal Structure, 7 pages.
International Preliminary Report on Patentability for PCT Appl. No. PCT/US2021/052015 mail date Apr. 6, 2023, 7 pages.
Extended European Search Report for Application No. 21873542.1 mail date Feb. 13, 2024, 7 pages.

* cited by examiner

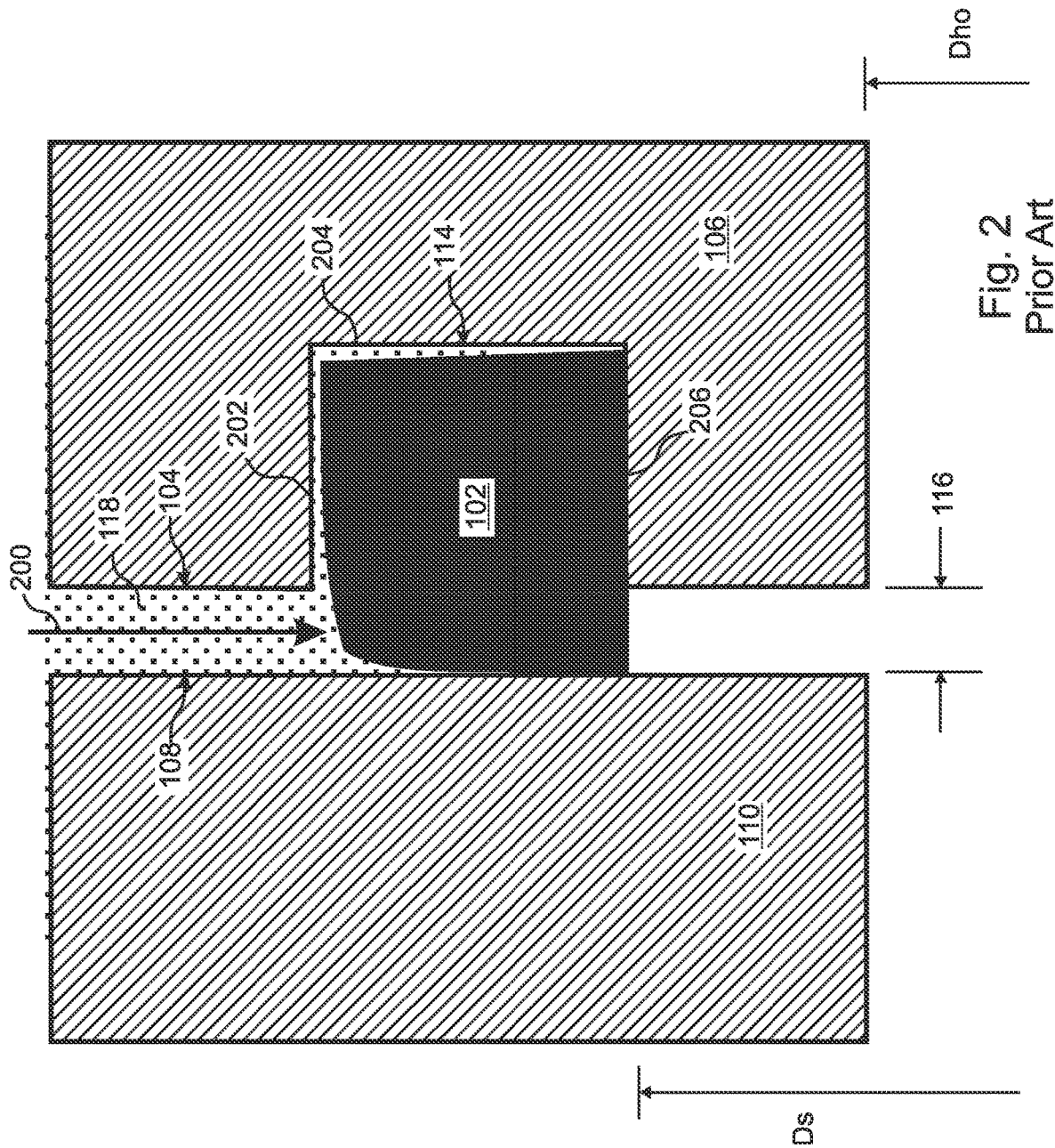

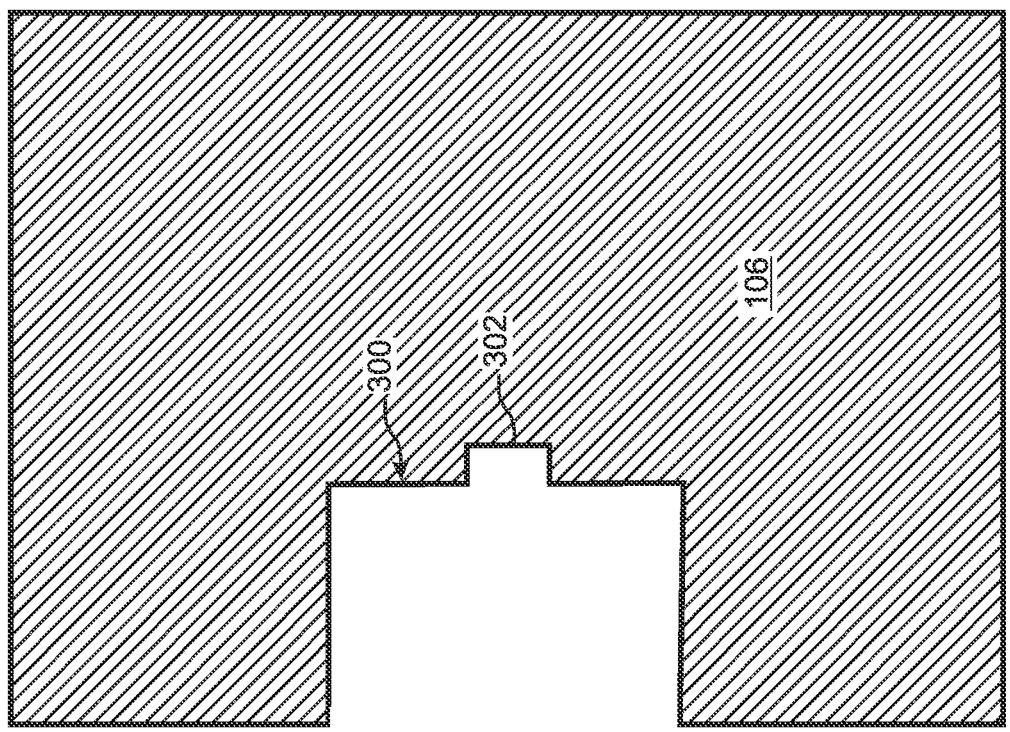
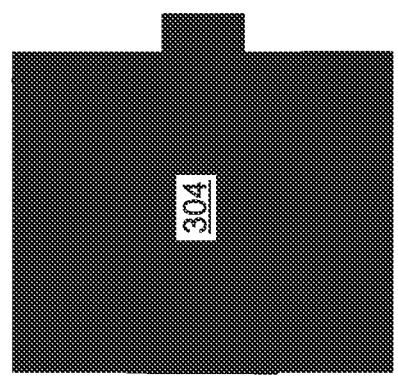
Fig. 3A

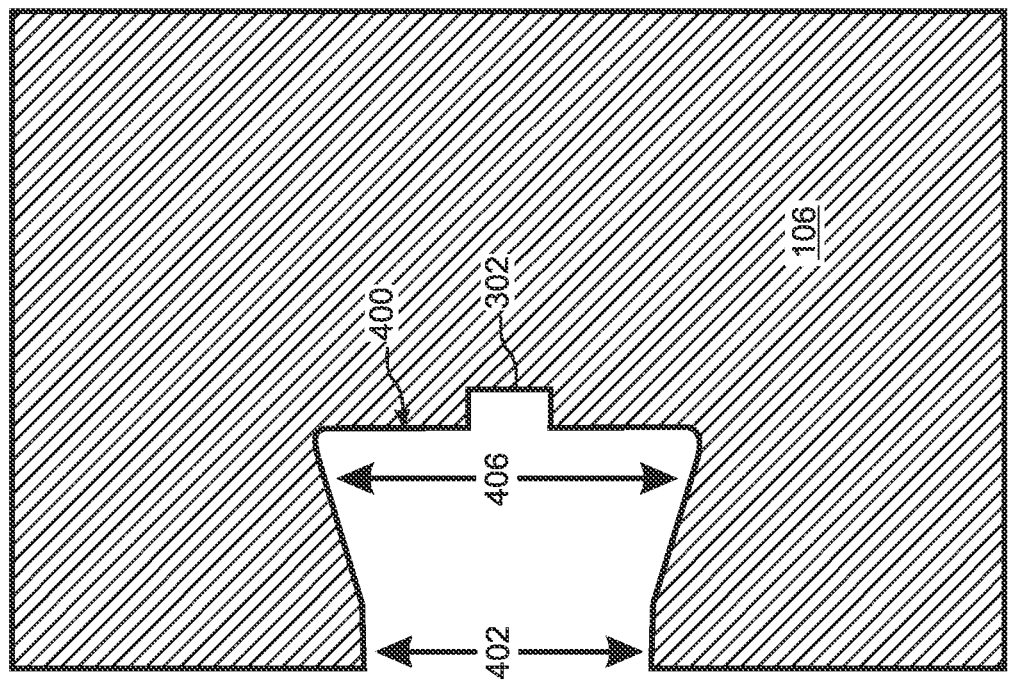
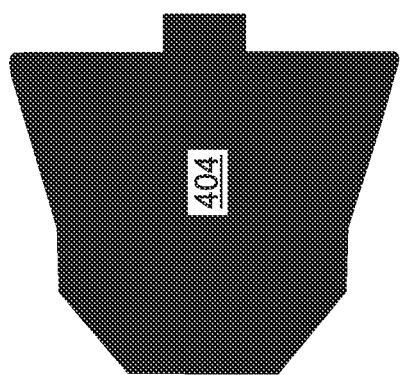
Fig. 4A

PRESSURE RETAINED GASKET SEAL WITH ENHANCED UNLOADING RESISTANCE

RELATED APPLICATIONS

This application claims the benefit of U.S. Provisional Application No. 63/083,521, filed Sep. 25, 2010, which is herein incorporated by reference in its entirety for all purposes.

FIELD OF THE INVENTION

The invention relates to gasket seals, and more particularly, to gasket seals that are maintained by pressure without positive retention.

BACKGROUND OF THE INVENTION

Flow control equipment, such as valves, pumps, and pump seals, typically require the use of static seals such as elastomeric gasket seals and non-elastomeric specialty gasket seals to establish continuity of the pressure boundary between disconnected components such as internal components, flanges, housing elements, and such like. Elastomeric gasket seals, such as O-rings are frequently used for less demanding applications, while non-elastomeric specialty gaskets, such as flexible graphite gaskets, are generally used to form seals under more extreme conditions of pressure and temperature.

In a typical static seal, a gasket is partially inserted into and protrudes outward from a "groove" that is provided in one of two parallel "sealing surfaces," and forms a seal between the groove and the opposed sealing surface when the two sealing surfaces are pressed toward each other. Due to the thickness of the gasket, the parallel sealing surfaces remain separated by a "seal gap," which allows process fluid on one side of the seal to contact one side of the gasket, but not to pass through to the other side of the gasket.

For ease of expression, both conventional gasket seals and embodiments of the present invention are described herein as having annual symmetry, wherein the gasket, the sealing surfaces, and the groove are all generally annular in shape and are arranged in an "axial" alignment, and wherein the process fluid contacts the gasket on a radially outer surface of the gasket within the seal gap. However, it will be understood that the teachings provided herein, both with regard to conventional gasket seals and with regard to embodiments of the present invention, apply equally to most or all gasket seal configurations unless otherwise required by the context.

In many cases, the gasket of a gasket seal is "positively retained" in the groove though a mechanical method such as by bolting together the parts that are being sealed, or by otherwise mechanically prevented them from separating, thus maintaining the seal under operating conditions and inhibiting the gasket from being pressed out of the groove by the adjacent process fluid. However, positive retention is not always feasible or practical due to space limitations. For instance, in rotating shaft end face mechanical seals, a gasket seal is often used to form a static "secondary" seal, either directly or through other, intervening components, between the rear annular surface of a "primary" seal ring and an underlying shaft or other underlying structure. Instead of implementing positive retention, the gaskets in these seals are frequently retained entirely by a "hydraulic loading force" that is applied to the seal due to the hydraulic pressure of the working fluid. Advantages of this approach, which is referred to herein as a "pressure-retained" gasket seal, can include design simplicity, reduced part count, smaller form factors, and ease in manufacturing.

FIG. 1A is a cross-sectional illustration of a simplified and idealized pressure-retained gasket seal 100. In the illustrated example a gasket 102 forms a pressure-retained hydraulic seal between a sealing surface 104 of a first element 106 and a parallel sealing surface 108 of a second element 110. The two elements 106, 110 and the gasket 102 are assumed in this example to be annular, and to be centered about a common axis 112. An annular groove 114 is formed in the first sealing surface 104, and the gasket 102 is inserted into and extends from the groove 114. The sealing surfaces 104, 108 are axially separated from each other by a seal gap 116 that arises due to the extension of the gasket 102 out from the groove 114. A process fluid 118 contacts a radially outward side of the seal 100, and enters the radially outward opening of the seal gap 116, but is unable to reach the radially inward opening of the seal gap 116 due to the intervention of the gasket 102.

In the idealized example of FIG. 1A the second element 110 is assumed to be fixed to a surrounding housing or other fixed structure, such that the hydraulic force that retains the gasket seal 102 arises from the pressure Po of the process fluid 118. Assuming that the first element 104 is annular, a force tending to retain the seal is applied to the axial face 120 of the first element 106 that is opposed to its seal face 104, and is given by $Po*p*[(Dr)^2-(Dho)^2]$, where Dr is the outer radius of the first element 104, and Dho is the inner radius of the first element 104. This force is partially offset by an opposing force exerted by the process fluid that is within the seal gap 106, given by $Po*p*[(Dr)^2-(Ds)^2]$, where Ds is the innermost radius that is accessible to the process fluid 118 within the seal gap 106. The net retaining force is therefore given by $Po*p*[(Ds)^2-(Dho)^2]$. Accordingly, in this idealized example the net hydraulic retaining force will be positive, so long as Ds is greater than Dho. This is sometimes referred to as the "gasket hydraulic advantage," and is typically the method employed to hydraulically retain gaskets. Note that a larger value of Ds implies that pressure is applied to a smaller area of the sealing surface 104 from within the seal gap 106.

Unfortunately, pressure reversals and/or other changes in the process fluid operating pressures can sometimes cause a pressure-retained gasket seal to lose its retention and become "hydraulically unloaded," so that the sealing surfaces are able to separate from each other, allowing the gasket to extrude out of the groove and into the seal gap. While gasket hydraulic advantage is easily achieved for gasket seals that are always pressurized only from one side, a pressure-retained gasket seal can become hydraulically unloaded if it depends upon a gasket hydraulic advantage to remain sealed, and if the seal undergoes a "pressure reversal," where a "pressure reversal" refers to an occurrence where a first fluid contacts a first side of the seal and a second fluid contacts a second side of the seal, and wherein the pressure of the first fluid transitions from being lower than the pressure of the second fluid to being higher than the pressure of the second fluid.

Many sealing systems are designed with multiple chambers that can vary in pressure such that, under certain operating conditions, a gasket seal can undergo a pressure reversal. In such systems, it is impossible to maintain gasket hydraulic advantage as described above. In fact, the difference between the diameters Ds and Dho that creates gasket hydraulic advantage in the absence of pressure reversal will accentuate the unloading effect during a pressure reversal.

Accordingly, with reference to FIGS. 1B, and 1C, pressure-retained gasket seal designs that are subject to pressure reversal, or that are otherwise unable to rely entirely on gasket hydraulic advantage, often incorporate a mechanical force device such as a spring 122 (FIG. 1B) or a bellows 124 (FIG. 1C) that applies an additional closing force to the gasket seal. However, if this additional applied force is independent of process fluid pressure (as is usually the case), then a process fluid pressure limit will apply to the gasket seal, above which the gasket seal will become subject to hydraulic unloading.

The process fluid pressure limit can be increased by increasing the spring constant of the mechanical force device and/or by minimizing the diameter difference between the diameters Ds and Dho. In practice, however, it can be difficult to increase the force constant of a spring or other mechanical force device, and it can be difficult to minimize the difference between the diameters Ds and Dho. For instance, the gaskets that are used in end face mechanical seals are subject to the same forces that are applied to the tribological contact surfaces, i.e. to the dynamic sealing surfaces between the seal rings. As such, it is necessary to limit the applied force so that the friction between the seal rings is minimized. Also, minimizing the diameter difference between Ds and Dho usually results in radially thin gaskets, which reduces the sealing capability of the seal by decreasing the sealing area of the gasket.

What is needed, therefore, is a pressure-retained gasket seal design that provides enhanced resistance to hydraulic unloading.

SUMMARY OF THE INVENTION

The present invention is a pressure-retained gasket seal design that provides enhanced resistance to hydraulic unloading. The novel seal design includes a small groove, referred to herein as a "notch," formed in the gasket retention groove into which a rear surface of the gasket extends. As a result, the diameter Ds is increased, thereby improving hydraulic retention of the gasket seal.

A further improvement that is implemented in embodiments of the present invention, in combination with the notch, is a dovetail shaping of the sides of the gasket groove that resists extrusion of the gasket from the groove by requiring compression of the gasket before it can be extruded from the groove.

Embodiments implement a gasket that is made from a flexible graphite rather than a traditional elastomer. The flexible graphite is formed into a ring shape having an initially rectangular cross section. The gasket is then forced into the groove within which it is to be retained, causing it to conform to the shape of the groove, including the notch.

Testing of embodiments of the present invention has demonstrated that the process fluid pressure limit of the present invention can be two or three times higher than for a more typical gasket of the prior art.

A first general aspect of the present invention is a pressure retained gasket seal that includes a first seal element having a substantially flat first sealing surface, a second seal element having a substantially flat second sealing surface arranged in opposition to the first sealing surface and separated from the first sealing surface by a seal gap, a groove formed in the second sealing surface, said groove having a groove entrance proximal to the first sealing surface, said groove further comprising first and second groove side walls and a groove posterior face opposite said groove entrance, said groove entrance having a groove entrance width and said groove posterior face having a groove posterior width, a notch formed in said groove posterior face, said notch having a notch entrance directed toward the groove entrance and toward the first sealing surface, said notch further comprising first and second notch sides and a notch posterior face, and a gasket installed within the groove and notch in close contact with the first and second groove sidewalls, with the groove posterior face, with the first and second notch sides, and with the notch posterior face, said gasket extending out of the groove entrance and across the seal gap in contact with the first sealing surface, a seal being formed by the gasket between the first and second sealing surfaces.

In embodiments, the groove posterior width is wider than the groove entrance width, the groove thereby having a dovetail cross-sectional shape.

In any of the above embodiments, the gasket can be made from flexible graphite.

A second general aspect of the present invention is a method of manufacturing a pressure retained gasket. The method includes providing a first seal element having a substantially flat first sealing surface, providing a second seal element having a substantially flat second sealing surface, forming a groove in the second sealing surface, said groove having a groove entrance, first and second groove side walls, and a groove posterior face opposite said groove entrance, said groove entrance having a groove entrance width and said groove posterior face having a groove posterior width, forming a notch in said groove posterior face, said notch having a notch entrance directed toward the groove entrance, first and second notch sides, and a notch posterior face opposite said notch entrance, installing a gasket into the groove and notch, so that the gasket is in close contact with the first and second groove sidewalls, with the groove posterior face, with the first and second notch sides, and with the notch posterior face, and arranging the first sealing surface in opposition to the second sealing surface, so that the first and second sealing surfaces are separated by a seal gap across which the gasket extends from the groove entrance to the first sealing surface, so that a seal is formed by the gasket between the first and second sealing surfaces.

In embodiments, forming the groove in the second sealing surface includes shaping the groove so that the groove posterior width is wider than the groove entrance width, the groove thereby having a dovetail cross-sectional shape.

In any of the above embodiments, the gasket can be made from flexible graphite. In some of these embodiments, the flexible graphite is a smooth, non-corrugated, flexible graphite ribbon. In any of these embodiments, installing the gasket in the groove can include applying a load to the flexible graphite, thereby compressing the flexible graphite and forcing the flexible graphite to conform in shape to the groove and the notch. In some of these embodiments tooling used to compress the flexible graphite comprises a smoothly finished surface thereof that contacts the flexible graphite during said compression of the flexible graphite. In any of these embodiments, installing the gasket in the groove can further include forming the flexible graphite into an annular shape before applying the load to thereto. In any of these embodiments the flexible graphite can be compressed by the applied load to at least 50% of its maximum density. And in any of these embodiments the flexible graphite can be compressed by the applied load to at least 70% of its maximum density.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

BRIEF DESCRIPTION OF THE DRAWINGS

FIG. 2 is a cross-sectional illustration of a pressure retained gasket seal similar to FIG. 1A, but illustrating typical, non-ideal behavior of the gasket when subject to pressure applied by process fluid;

FIG. 3A is a cross-sectional illustration of an embodiment of the present invention, shown with the gasket removed from the gasket groove;

FIG. 4A is a cross-sectional illustration of an embodiment of the present invention in which the gasket groove includes a dovetail cross-sectional shape, where the gasket is shown removed from the gasket groove;

DETAILED DESCRIPTION

The present invention is a pressure-retained gasket seal design that provides enhanced resistance to hydraulic unloading. More specifically, the resistance to hydraulic unloading is increased by the provision of a small groove, referred to herein as a "notch," formed in the gasket retention groove, into which a rear surface of the gasket extends.

Figure 1A:
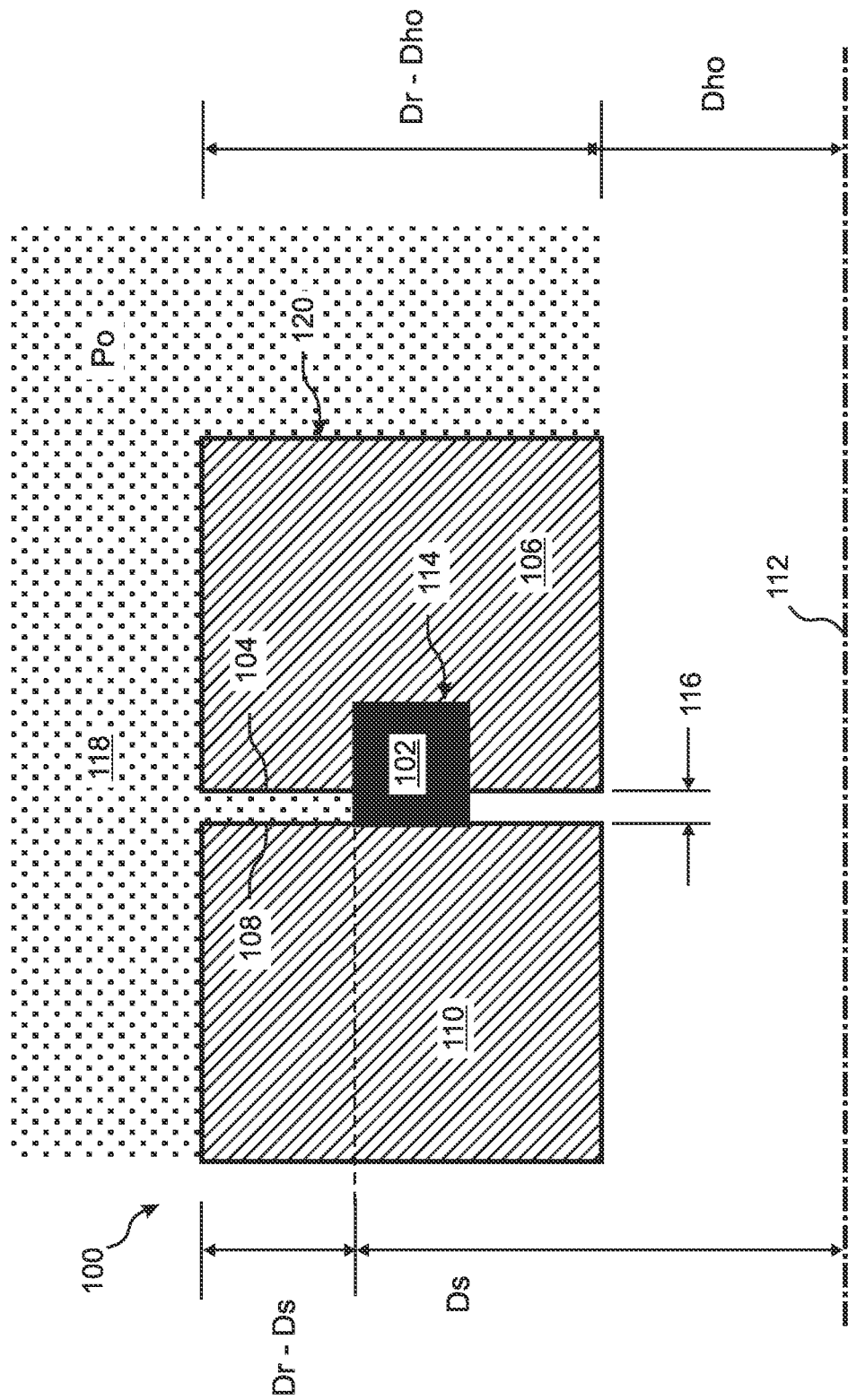
FIG. 1A is a cross-sectional illustration of an idealized pressure retained gasket seal of the prior art.
Figure 1B:
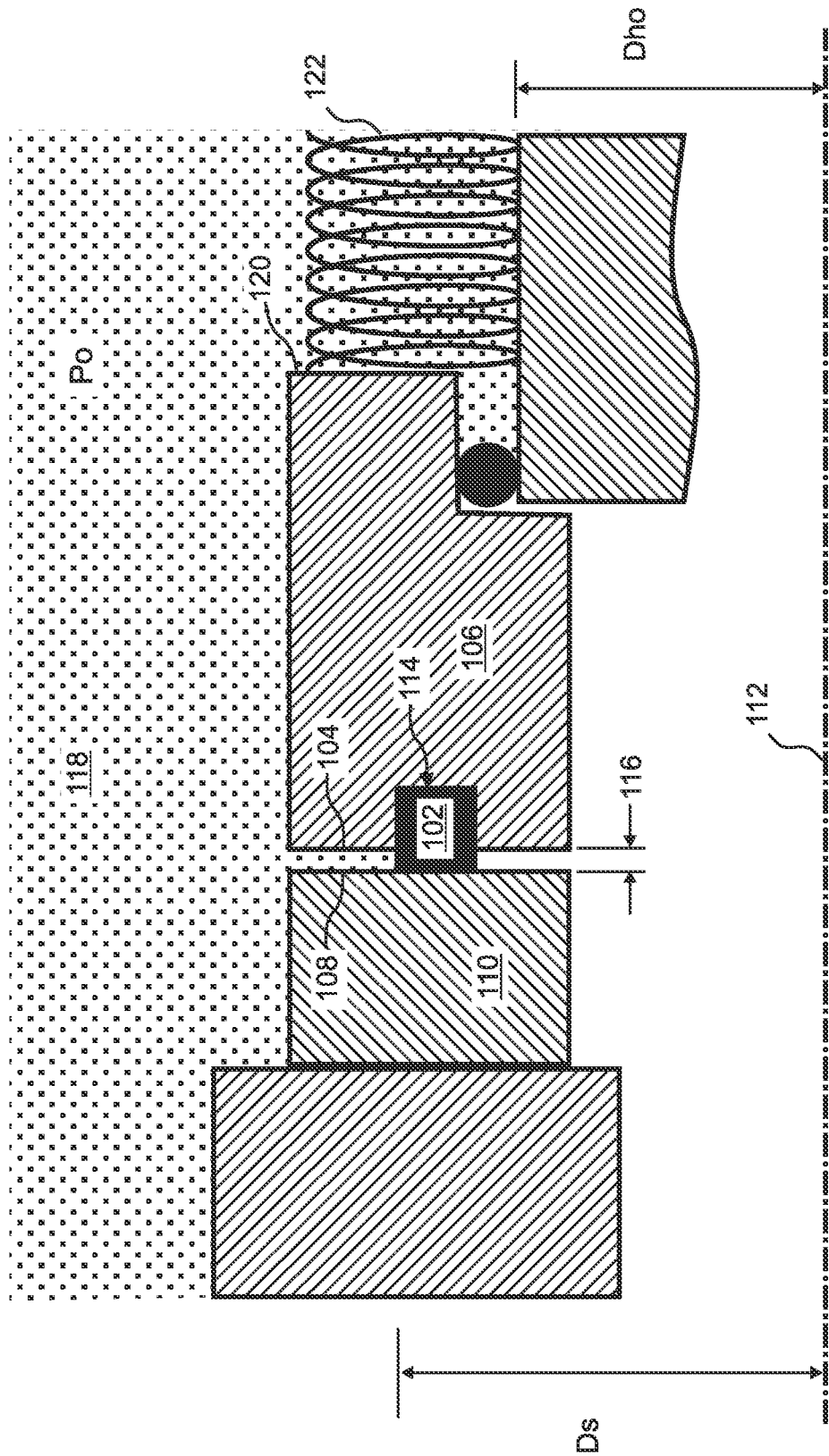
FIG. 1B is a cross-sectional illustration of an idealized pressure retained gasket seal included in an end face mechanical seal of the prior art wherein the retaining force is enhanced by force applied by a spring.
Figure 1C:
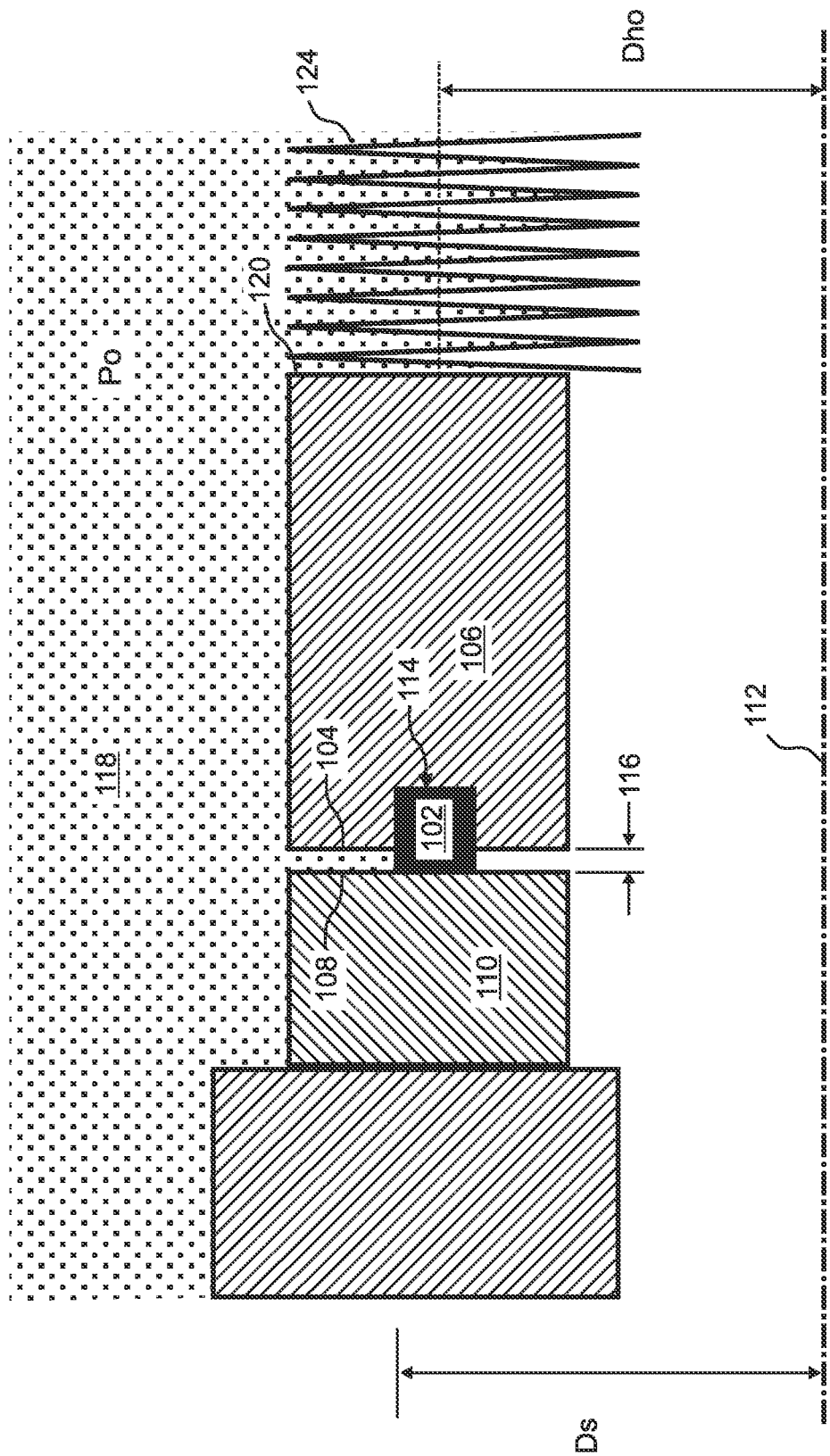
FIG. 1C is a cross-sectional illustration of an idealized pressure retained gasket seal included in an end face mechanical seal of the prior art wherein the retaining force is enhanced by force applied by a bellows.

The present invention was enabled by an enhanced understanding of the behavior of actual pressure-retained gasket seals, which can differ significantly from the ideal behavior shown in FIGS. 1A-1C as discussed in the Background section above. In particular, FIG. 2 is a cross-sectional close-up view of the gasket 102 and adjoining elements 106, 110 of a seal similar to FIG. 1A, but showing how the gasket has been found to behave under practical, i.e. non-ideal, conditions. FIG. 2 has been indicated to be "prior art" in the sense that it does not present any aspects of the present invention. However, Applicant believes that this behavior of pressure-retained gasket seals under actual operating conditions was not generally understood before the present invention.

As can be seen in FIG. 2, under actual conditions the process fluid 118 exerts a radially inward force 200 onto the gasket 102, which causes the gasket to be compressed radially inward and away from the radially outward face 202 of the groove 114, and to be pulled axially away from the axial face 204 of the groove 114. For this reason, the process fluid is able to enter the groove 114 and to flow behind the gasket 102. However, this same radially inward force 200 presses the gasket 102 against the radially inward wall 206 of the groove 114, enhancing the seal at that radius and preventing the process fluid 118 from flowing past the seal. As a result, Ds, which is the innermost radius that is accessible to the process fluid 118 within the seal gap 106, is reduced from the ideal case of FIG. 1A by an amount that approaches or is equal to the width of the gasket 102. As explained above, this reduction in Ds leads to a reduction in the net force that retains the gasket within the groove.

Figure 3B:
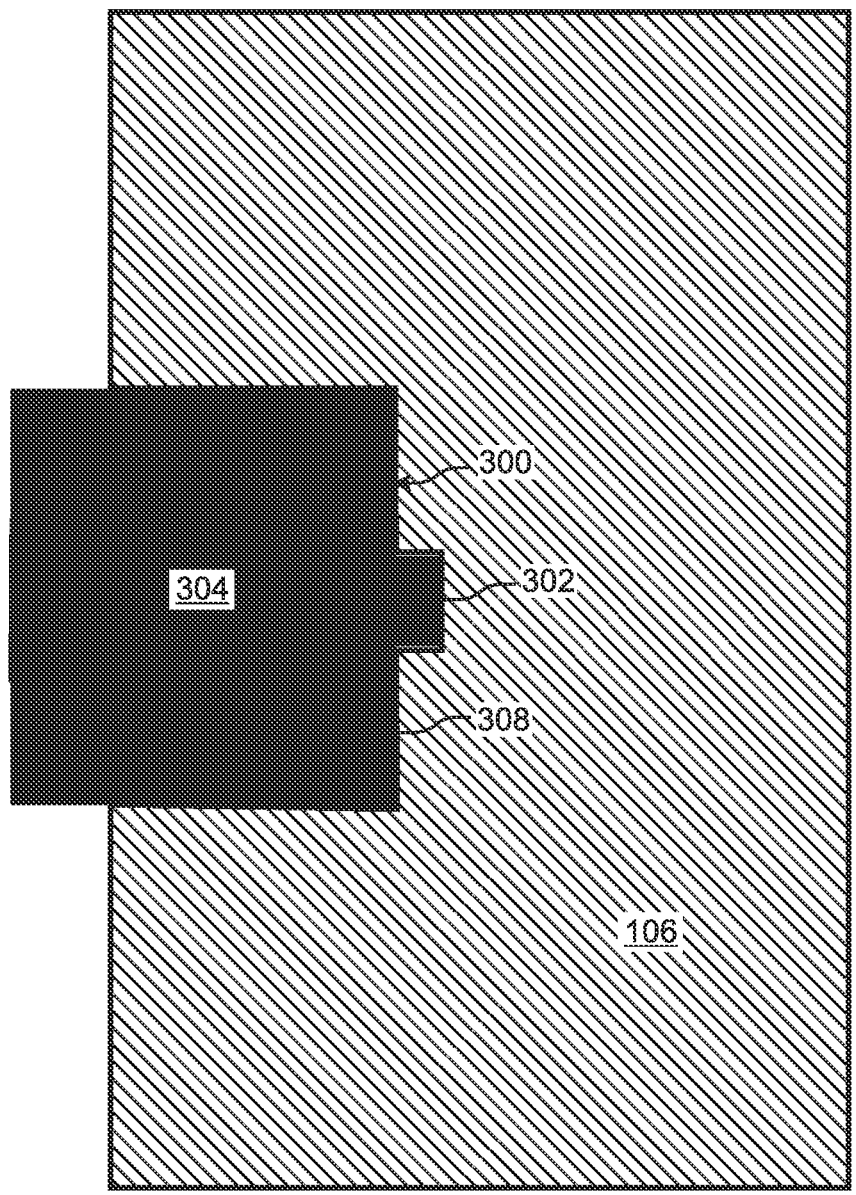
FIG. 3B is a cross-sectional illustration of the embodiment of FIG. 3A, shown with the gasket installed in the gasket groove.

With reference to FIGS. 3A and 3B, the pressure retained gasket seal of the present invention comprises a gasket groove 300 that includes a smaller groove or "notch" 302 formed in the axial face 306 of the gasket groove 300. The gasket 304 of the disclosed seal is formed so that it will extend into the notch 304 when it is seated in the gasket groove 300. FIG. 3A shows the gasket 304 positioned next to the gasket groove 300, while FIG. 3b shows the gasket 304 installed in the gasket groove 300.

Figure 3C:
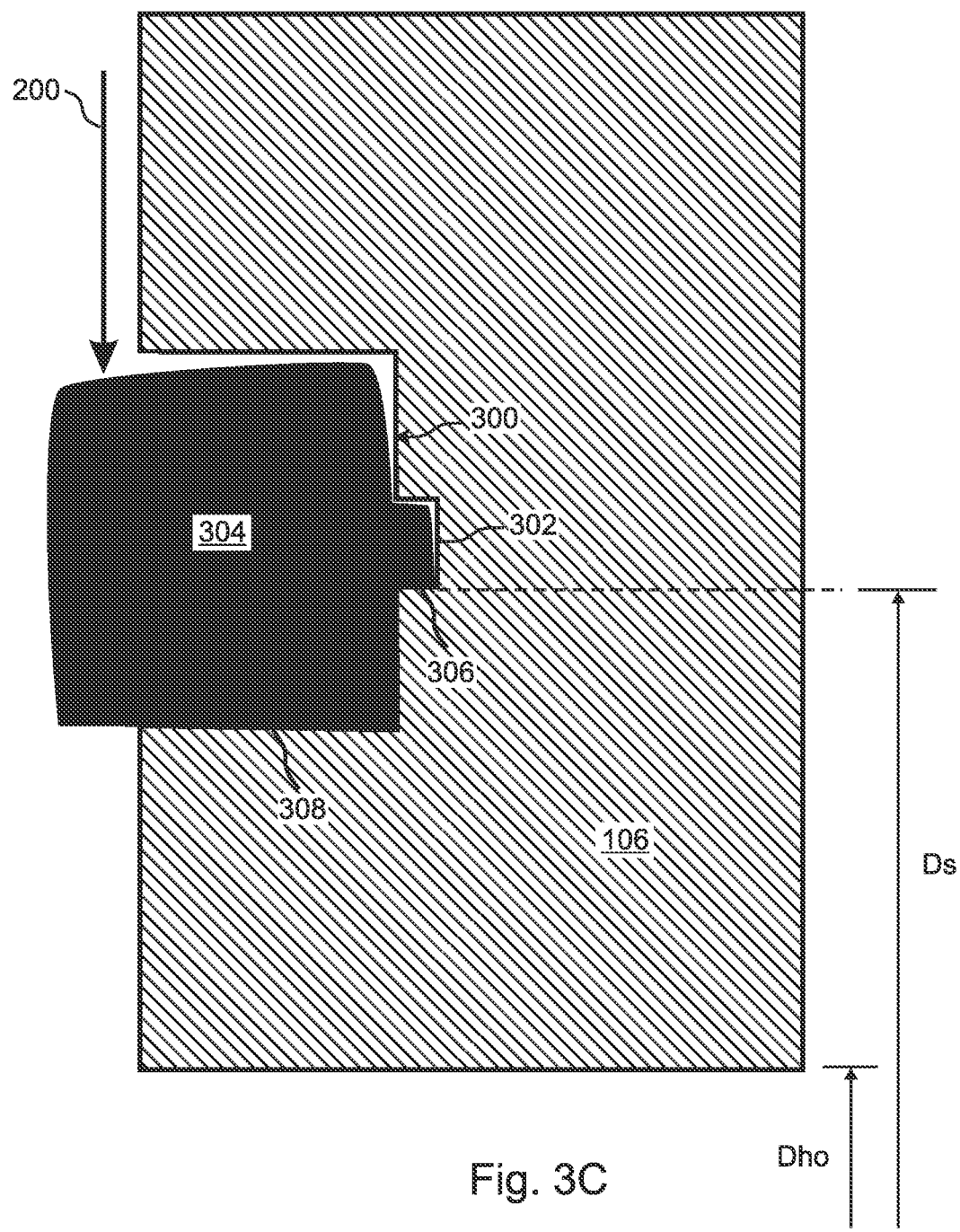
FIG. 3C is a cross-sectional illustration of the embodiment of FIG. 3B, showing behavior of the gasket when subject to pressure applied by process fluid.

With reference to FIG. 3C, when the process fluid 118 applies a radially inward force to the gasket 304, the gasket 304 is distorted in a manner similar to what is shown in FIG. 2. However, the process fluid is prevented from flowing past the radially inward boundary 306 of the notch 302, rather than being able to reach the radially inward boundary 308 of the gasket groove 300. The result is a significant increase in Ds in FIG. 3C as compared to FIG. 2. This increase of Ds results in a significant increase in the net force that retains the gasket 304 within the gasket groove 300.

Figure 4B:
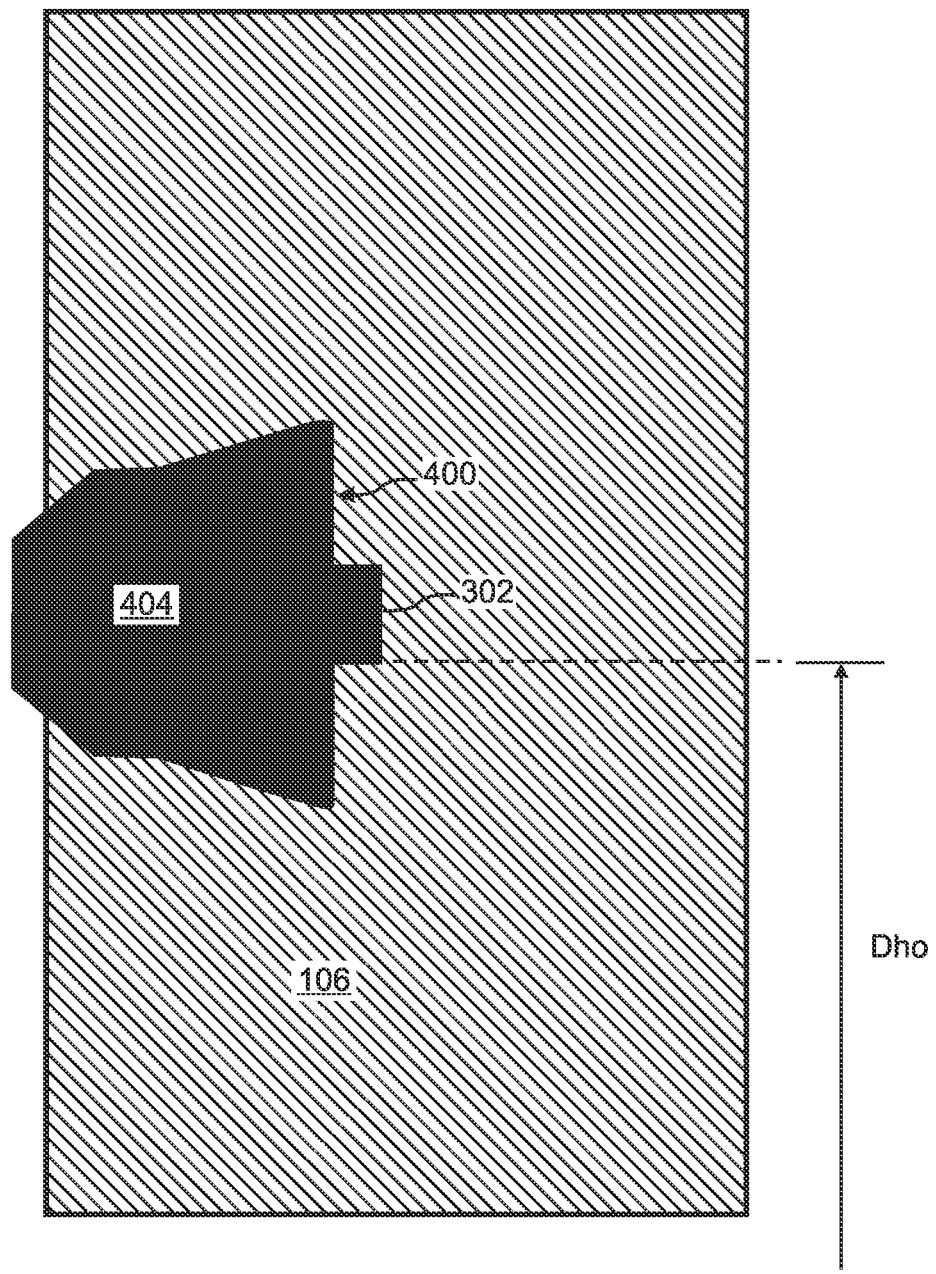
FIG. 4B is a cross-sectional illustration of the embodiment of FIG. 4A, shown with the gasket installed in the gasket groove.

With reference to FIGS. 4A and 4B, in embodiments retention of the gasket 404 in the gasket groove 400 is further enhanced by creating a "dovetail" shaping of the gasket groove 400, whereby the entrance to the groove 402, i.e. the opening that is directed toward the opposing seal element 110, is smaller than the cross-sectional width 406 of the gasket groove 400 at locations that are axially offset from the entrance 402. As a result, once the gasket 404 is installed within the gasket groove 400, as shown in FIG. 4B, it is necessary to compressively deform the gasket 404 before it can be extruded out of the gasket groove 400. This increases the force, and hence the pressure of the process fluid 118, that is required to unload the gasket 404 as compared to grooves 300 and gaskets 304 having a rectangular cross section.

Figure 5:
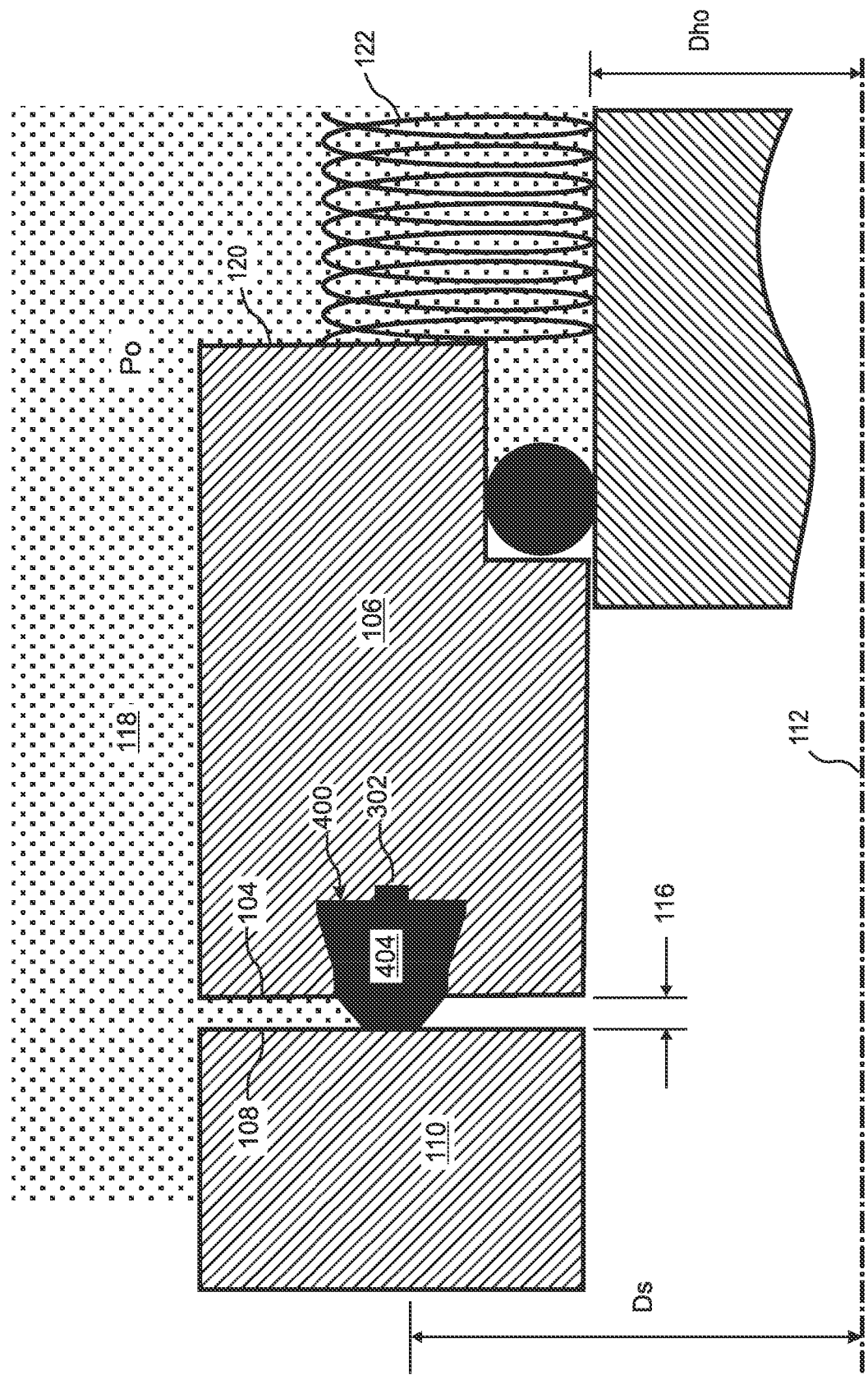
FIG. 5 is a cross-sectional illustration of an end face mechanical seal that is similar to FIG. 1B, but which in which the embodiment of FIG. 4B has been implemented.

FIG. 5 is a cross-sectional illustration of an end face mechanical seal that is similar to FIG. 1B, but which in which the embodiment of FIG. 4B has been implemented In embodiments, the gasket is made from flexible graphite. According to method embodiments of the present invention, the graphite is initially formed into a ring shape having a rectangular cross section. The gasket is then installed in the gasket groove by applying a load to the graphite, thus forcing the graphite material to conform to the shape of the groove, including the notch, and in embodiments also to the dovetail shaping of the gasket groove.

In embodiments, the gasket is formed from smooth, non-corrugated, flexible graphite ribbon so as to ensure that the gasket presents a smooth exposed sealing surface. For the same reason, the tooling that is used to compress the gasket during installation in the gasket groove must also have a smooth finish on the surface that contacts the graphite gasket material. Also, the load applied to the graphite during installation in the groove must be sufficient to force the graphite material to fill any voids and to conform exactly to the shape of the groove, including the notch, and in embodiments also the dovetail shape of the groove. To achieve this result in practice, the load is applied in embodiments until the graphite material reaches more than 50% of its maximum density, and in embodiments until it reaches at least 70% of its maximum density. In practice, the achievement of these high graphite densities is evidenced by a rapid increase in the required compression load as a function of compression distance of the graphite.

The foregoing description of the embodiments of the invention has been presented for the purposes of illustration and description. Each and every page of this submission, and all contents thereon, however characterized, identified, or numbered, is considered a substantive part of this application for all purposes, irrespective of form or placement within the application. This specification is not intended to be exhaustive or to limit the invention to the precise form disclosed. Many modifications and variations are possible in light of this disclosure.

Although the present application is shown in a limited number of forms, the scope of the invention is not limited to just these forms, but is amenable to various changes and modifications without departing from the spirit thereof. The disclosure presented herein does not explicitly disclose all possible combinations of features that fall within the scope of the invention. The features disclosed herein for the various embodiments can generally be interchanged and combined into any combinations that are not self-contradictory without departing from the scope of the invention. In particular, the limitations presented in dependent claims below can be combined with their corresponding independent claims in any number and in any order without departing from the scope of this disclosure, unless the dependent claims are logically incompatible with each other.

We claim:

1. A system comprising:
   a static seal configured to maintain a pressure boundary between a first region and a second region of the system across a junction between first and second components of the system, the static seal having a first side abutting one of the first and second regions and a second side abutting the other of the first and second regions; and
   a process fluid in fluid contact with the first side of the static seal and applying a first hydraulic pressure thereto, said first hydraulic pressure being greater than a second hydraulic pressure on the second side of the static seal, a hydraulic pressure differential being thereby created between the first and second sides of the static seal, the static seal being configured to prevent the process fluid from passing through from the first side to the second side of the static seal;
   wherein the static seal comprises:
      a first seal element surrounding the first region at the junction, the first seal element having a substantially flat first sealing surface;
      a second seal element surrounding the first region at the junction, the second seal element having a substantially flat second sealing surface arranged in opposition to the first sealing surface and separated from the first sealing surface by a seal gap, the first seal element and the second seal element being fixed in position and orientation relative to each other;
      a groove formed in the second sealing surface and surrounding the first region at the junction, said groove having a groove entrance proximal to the first sealing surface, said groove further comprising first and second groove side walls and a groove posterior face opposite said groove entrance, said groove entrance having a groove entrance width and said groove posterior face having a groove posterior width;
      a notch formed in said groove posterior face and surrounding the first region at the junction, said notch having a notch entrance directed toward the groove entrance and toward the first sealing surface, said notch further comprising first and second notch sides and a notch posterior face; and
      a non-elastomeric gasket continuously surrounding the first region at the junction, the gasket being having a pre-shaped cross-section that conforms in shape to the groove and the notch, and causes the gasket, when installed within the groove and notch, to be in close contact with the first and second groove sidewalls, with the groove posterior face, with the first and second notch sides, and with the notch posterior face when the gasket is not deformed, said gasket extending out of the groove entrance and across the seal gap in contact with the first sealing surface, a seal being formed by pressing the gasket between the first and second sealing surfaces, the gasket thereby forming a pressure boundary between the first and second sides of the static seal;
   and wherein said pressing of the gasket between the first and second sealing surfaces is either entirely due to said hydraulic pressure differential, or entirely due to said hydraulic pressure differential in combination with pressure applied by a spring or a bellows.

2. The pressure retained gasket seal of claim 1, wherein the groove posterior width is wider than the groove entrance width, the groove thereby having a dovetail cross-sectional shape.

3. The pressure retained gasket of claim 1, wherein the gasket is made from flexible graphite.

4. A method of maintaining a pressure boundary between a first region and a second region of a system across a junction between first and second components of the system, thereby preventing a process fluid from crossing between the regions, the method comprising:
   manufacturing a static seal having a first side and a second side;
   installing the static seal in the system surrounding the first region at the junction between the first and second components such that the first region abuts one of the first and second sides of the static seal, and the second region abuts the other of the first and second sides of the static seal; and
   applying a process fluid in fluid contact with the first side of the static seal, said process fluid applying a first hydraulic pressure thereto, said first hydraulic pressure being greater than a second hydraulic pressure on the second side of the static seal, a hydraulic pressure differential being thereby created between the first and second sides of the static seal,
   wherein manufacturing the static seal comprises:
      providing a first seal element having a substantially flat first sealing surface configured to surround the first region at the junction;
      providing a second seal element having a substantially flat second sealing surface configured to surround the first region at the junction;
      forming a groove in the second sealing surface configured to surround the first region at the junction, said groove having a groove entrance, first and second groove side walls, and a groove posterior face opposite said groove entrance, said groove entrance having a groove entrance width and said groove posterior face having a groove posterior width;

forming a notch in said groove posterior face configured to surround the first region at the junction, said notch having a notch entrance directed toward the groove entrance, first and second notch sides, and a notch posterior face opposite said notch entrance; and pre-shaping a non-elastomeric gasket to have a cross-sectional shape that conforms in shape to the groove and the notch;

installing the gasket into the groove and notch, the pre-shaping of the gasket causing the gasket to be in close contact with the first and second groove sidewalls, with the groove posterior face, with the first and second notch sides, and with the notch posterior face when the gasket is not deformed;

wherein installing the static seal in the system comprises:
arranging the first sealing surface in opposition to the second sealing surface, so that the first and second sealing surfaces are separated by a seal gap across which the gasket extends from the groove entrance to the first sealing surface, wherein the first and second sealing surfaces both surround the first region at the junction, and the gasket continuously surrounds the first region at the junction; and pressing the gasket between the first and second sealing surfaces, the gasket thereby forming a boundary between the first and second sides of the static seal;

wherein said pressing of the gasket between the first and second sealing surfaces arises either entirely due to said hydraulic pressure differential, or entirely due to said hydraulic pressure differential in combination with pressure applied by a spring or a bellows.

5. The method of claim 4, wherein forming the groove in the second sealing surface includes shaping the groove so that the groove posterior width is wider than the groove entrance width, the groove thereby having a dovetail cross-sectional shape.

6. The method of claim 4, wherein the gasket is made from flexible graphite.

7. The method of claim 6, wherein, before the pre-shaping thereof, the flexible graphite is a smooth, non-corrugated, flexible graphite ribbon.

8. The method of claim 6, wherein the pre-shaping of the gasket includes applying a load to the flexible graphite, thereby compressing the flexible graphite and forcing the flexible graphite to conform in shape to the groove and the notch.

9. The method of claim 8, wherein tooling used to compress the flexible graphite comprises a smoothly finished surface thereof that contacts the flexible graphite during said compression of the flexible graphite.

10. The method of claim 8, wherein the pre-shaping of the gasket further includes forming the flexible graphite into an annular shape before applying the load to thereto.

11. The method of claim 8, wherein the flexible graphite is compressed by the applied load to at least 50% of its maximum density.

12. The method of claim 8, wherein the flexible graphite is compressed by the applied load to at least 70% of its maximum density.

13. The method of claim 4, wherein said pressing of the gasket between the first and second sealing surfaces arises entirely due to said hydraulic pressure differential.

14. The method of claim 4, wherein said pressing of the gasket between the first and second sealing surfaces arises entirely due to said hydraulic pressure differential in combination with pressure applied by a spring or a bellows.

15. The system of claim 1, wherein the said pressing of the gasket between the first and second sealing surfaces arises entirely due to said hydraulic pressure differential.

16. The system of claim 1, said pressing of the gasket between the first and second sealing surfaces arises entirely due to said hydraulic pressure differential in combination with pressure applied by a spring, or a bellows.

* * * * *